United States Patent
Geng et al.

(10) Patent No.: US 10,579,469 B2
(45) Date of Patent: Mar. 3, 2020

(54) INTERCONNECTION NETWORK FOR INTEGRATED CIRCUIT

(71) Applicant: Arm Limited, Cambridge (GB)

(72) Inventors: Guanghui Geng, Sheffield (GB); Andrew David Tune, Dronfield (GB)

(73) Assignee: Arm Limited, Cambridge (GB)

( * ) Notice: Subject to any disclaimer, the term of this patent is extended or adjusted under 35 U.S.C. 154(b) by 96 days.

(21) Appl. No.: 15/989,224

(22) Filed: May 25, 2018

(65) Prior Publication Data
US 2019/0361770 A1 Nov. 28, 2019

(51) Int. Cl.
| G06F 7/02 | (2006.01) |
| H03M 13/00 | (2006.01) |
| G06F 11/10 | (2006.01) |
| G06F 13/40 | (2006.01) |

(52) U.S. Cl.
CPC ...... *G06F 11/1004* (2013.01); *G06F 13/4027* (2013.01)

(58) Field of Classification Search
CPC combination set(s) only.
See application file for complete search history.

(56) References Cited

U.S. PATENT DOCUMENTS

| 7,277,425 B1 * | 10/2007 | Sikdar | H04L 12/5601 370/351 |
| 2003/0026267 A1 * | 2/2003 | Oberman | H04L 47/10 370/397 |
| 2005/0089327 A1 * | 4/2005 | Ovadia | H04L 45/04 398/47 |
| 2008/0008202 A1 * | 1/2008 | Terrell | H04L 45/00 370/401 |
| 2010/0183022 A1 * | 7/2010 | Berman | H04L 49/30 370/419 |
| 2018/0097720 A1 * | 4/2018 | Jaffer | H04L 45/22 |

* cited by examiner

*Primary Examiner* — Guerrier Merant
(74) *Attorney, Agent, or Firm* — Nixon & Vanderhye P.C.

(57) ABSTRACT

An interconnection network for providing data transfer between a plurality of nodes of an integrated circuit comprises a number of endpoints for exchanging data with respective nodes of the integrated circuit, a primary network to route a primary payload from a source endpoint to a destination endpoint; and a redundant network to route, to the destination endpoint, a redundant payload comprising a first check code calculated based on at least a portion of the primary payload, the first check code having fewer bits than said at least a portion of the primary payload. The destination endpoint comprises error checking circuitry to perform an error checking operation to calculate a second check code based on the primary payload received via the primary network, and verify integrity of the primary payload based on a comparison of the second check code with the first check code received via the redundant network.

20 Claims, 8 Drawing Sheets

INTERCONNECTION NETWORK FOR INTEGRATED CIRCUIT

BACKGROUND

Technical Field

The present technique relates to the field of integrated circuits. More particularly it relates to an interconnection network for providing data access between nodes of an integrated circuit.

Technical Background

An integrated circuit, for example a system on chip, may include a number of components which may communicate by issuing data access requests specifying a target address. An interconnection network may be provided which provides data transfer between nodes of the integrated circuit.

SUMMARY

At least some examples provide an interconnection network for providing data access between nodes of an integrated circuit, comprising: a plurality of ports, each port to exchange data with a corresponding node of the integrated circuit, wherein at least one of the ports is an ingress port comprising: route selection circuitry responsive to a request received from a requesting node at the ingress port, to select an actual version of a route vector, which specifies a route corresponding to at least a portion of a path along which a payload should be routed to reach a selected egress port; wherein, in response to the request, the ingress port is configured to: transmit the actual version of the route vector with the payload; obtain an initial error detecting code calculated based on a pre-manipulated version of the route vector, wherein the pre-manipulation corresponds to a manipulation of the route vector to be performed by at least one downstream component along the route specified in the route vector; and transmit the initial error detecting code.

A storage medium may be provided to store an electronic design file representing a design of an interconnection network as discussed above. The storage medium may be a non-transitory storage medium.

At least some examples provide a computer-implemented method of generating an electronic design file representing a design of an interconnection network for providing data transfer between nodes of an integrated circuit; the electronic design file defining the interconnection network comprising a plurality of ports, each port to exchange data with a corresponding node of the integrated circuit, wherein the ports include at least one ingress port and at least one egress port; the method comprising, for a given ingress port: selecting an egress port to which a payload received at the given ingress port is to be transmitted; determining one or more paths for routing the payload to the selected egress port; and for each of the one or more paths: generating an actual version of a route vector, which specifies a route corresponding to at least a portion of the path; manipulating the route vector corresponding to a manipulation of the route vector performed along the route specified in the route vector, to generate a pre-manipulated version of the route vector; and generating or updating the electronic design file to indicate that the interconnection network comprises storage circuitry to store the actual version of the route vector and one of: the pre-manipulated version of the route vector; and an initial error detecting code calculated based on the pre-manipulated version of the route vector.

A storage medium may be provided to store a computer program for controlling a data processing apparatus to perform the method for generating the electronic design file discussed above. The storage medium may be a non-transitory storage medium.

Further aspects, features and advantages of the present technique will be apparent from the following description of examples, which is to be read in conjunction with the accompanying drawings.

DESCRIPTION OF EXAMPLES

Figure 1:
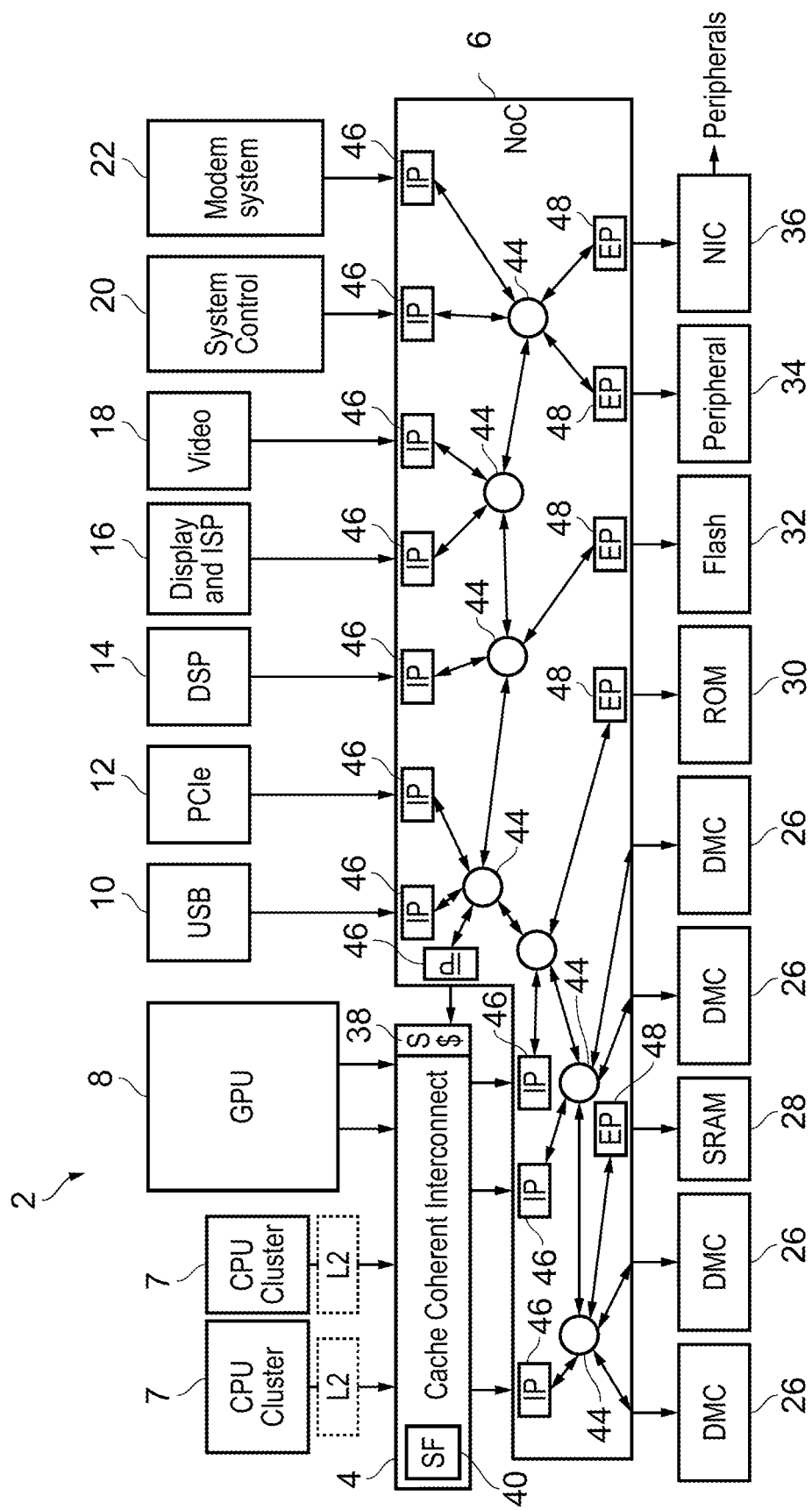
FIG. 1 shows an example of a data processing system including at least one interconnection network.

An interconnection network may be provided in an integrated circuit for providing data transfer between a number of nodes of the integrated circuit. For example the nodes connected by the interconnection network could include processor cores, graphics processing units, network controllers, etc. The network may have a number of endpoints each for exchanging data with a respective node of the integrated circuit, and transmission channels for routing payloads from a source endpoint to a destination endpoint. Optionally, the network could also include additional components, such as routers for selecting between alternative downstream transmission channels, data resizing components, and/or clock or power domain crossing units for bridging across clock or power domains. The interconnection network may include at least one ingress port for interfacing with a requesting node of the integrated circuit from which a request to route a transaction across the network may be received, and at least one egress port for interfacing with a destination node of the integrated circuit to which the transaction is to be transmitted.

Functionally correct integrated circuit designs may sometimes experience hardware faults, for example caused by an ionising particle striking a component of the circuit. If the fault occurs in the interconnection network, the fault may prevent the correct data reaching the appropriate destination, either due to the data changing value during transmission, or due to the data being misrouted so that it does not arrive (or is delayed in arriving) at the correct destination. The faults may include permanent faults, e.g. when a flip-flop or other storage element of the integrated circuit becomes stuck at a particular value regardless of the input to that storage element, causing subsequent signals dependent on that storage element to have a bit tied to 0 or 1. Also, the interconnection network could be subject to transient faults, e.g. where a bit of a transmitted value changes states during transmission due to a particle strike, but subsequently transmitted values are still correct as there was no permanent damage to the circuit hardware. Faults may also include wires stuck at a particular value, open wire faults, short circuit faults, and high-impedance wire faults.

In integrated circuits designed for applications where functional safety is important, such as automotive applications, it may be desirable to provide mechanisms for detecting the occurrence of faults in the interconnection network.

In the technique discussed below, route selection circuitry in an ingress port is responsive to a request received from at the ingress port a requesting node, to select an actual version of a route vector. The route vector specifies a route corresponding to at least a portion of a path along which a payload should be routed to reach a selected egress port.

In response to such a request, the ingress port is configured to transmit the actual version of the route vector with the payload. The ingress port is configured to obtain an initial error detecting code (EDC) calculated based on a pre-manipulated version of the route vector. The pre-manipulation corresponds to a manipulation of the route vector to be performed by at least one downstream component along the route specified in the route vector. The ingress port is configured to transmit the initial EDC. Hence, the initial EDC should, if no errors occur, be the same as an EDC calculated based on the version of the route vector that will be received at the endpoint of the route specified in the actual version of the route vector if the payload is transmitted along the indented route. This allows routing control errors in the transmission of the payload to be detected even if the routing control errors do not prevent the payload from reaching the intended destination, for example if the payload is routed along an incorrect route but still reaches the intended destination. While one might expect that as long as the payload reaches the intended destination, then no error has occurred, in practice in some systems the correct behaviour at the destination node may be sensitive to the relative order in which payloads are received at the destination. Therefore, if a payload is misrouted but still eventually arrives at the correct destination, it could be received after a later transmitted packet from the same requesting node, which could cause incorrect behaviour. By calculating the EDC based on a pre-manipulated version of the route vector, this allows detection of such routing errors which do not prevent the packet reaching the correct destination. In some examples, the ingress port is a network bridge between two portions of the interconnection network.

In some examples, the route specified in the route vector comprises one or more routers, the manipulation of the route vector comprises one or more sequentially applied steps, and each of the one or more routers is configured to perform one of the one or more sequentially applied steps to the route vector. Hence the route vector can contain routing information to be used by multiple routers. Since the route vector is manipulated at each router such that it is in a different format when it is received at the next router along the route, this enables a router design to be used which does not need to be aware of its relative position within the network, and which simply performs the same step as other routers regardless of the position of the router. In contrast, if no manipulation was applied to the route vector as it travels across the network, each router would need to be aware of its relative position in order to determine which portion of the route vector to check. In some examples, the sequentially applied step applied at each router may be a shift or rotation of the route vector by a predetermined number of bits.

In some examples, each of the one or more routers is configured to select, based on a predetermined portion of the route vector, one of a plurality of downstream paths to route the payload down. Hence the route vector can be used by each of the routers to determine the next path to route the payload down, thus ensuring the payload is directed along the correct path. As each router references the same predetermined portion of the route vector, each router does not need to be aware of how many other routers have encountered the payload prior to arrival at that router, making it much more efficient to generate a wide variety of network topologies using single position-independent router design. In particular, a shift or rotation of the route vector at each router may result in the next field of the route vector being shifted into the predetermined portion which will be used for selecting the downstream path at the next router in the route taken across the network.

In some examples, the initial EDC comprises a type of EDC capable of detecting multi-bit errors. Hence the initial EDC can be used to detect multiple errors and multi-bit errors in the transmission of the payload along the route. Although it may be relatively unlikely that the same payload transmission can encounter two separate events each introducing an error due to an independent cause (such as two separate particle strikes), in some cases a single cause of error (e.g. particle strike) may cause a bit to flip in a control signal or in control logic (such as the logic for manipulating the route vector or selecting a downstream path based on the route vector), which can result in multiple bits being caused to be erroneous in the payload received at the destination even though only one bit was directly affected by the initial cause of the error. Hence, using a type of EDC capable of detecting multi-bit errors can be useful.

In some examples, the route vector specifies an endpoint for the route. The endpoint comprises verification circuitry configured to calculate an end EDC based on a version of the route vector received with the payload at the endpoint. The verification circuitry is also configured to compare the end EDC with the initial EDC transmitted from the ingress port, and to determine that an error has occurred when a mismatch is detected between the end EDC and the initial EDC. Hence the route vector received with the payload at the endpoint can be used to calculate an end EDC which should be the same as the initial EDC if the payload was transmitted along the correct route. If the end EDC and the initial EDC are different, it can be determined that an error has occurred in the transmission of the payload, for example the payload was transmitted along an incorrect route.

In some examples, the verification circuitry is further configured to compare an identifier associated with the endpoint with a transmitted endpoint identifier associated with the payload. If the identifier associated with the endpoint and the transmitted endpoint identifier in the payload are different, it can be determined that an error has occurred. For example, a difference between the identifier associated with the endpoint and the transmitted endpoint identifier would indicate that the payload has been delivered to the incorrect endpoint.

In some examples, the endpoint is the selected egress port. This allows the end EDC to be compared with the initial EDC at the selected egress port. If the end EDC and the initial EDC are the same, the payload is determined to have been transmitted correctly and can be transmitted by the selected egress port to the intended destination of the payload. If the end EDC and the initial EDC are different, it is determined that an error has occurred and appropriate action can be taken, for example preventing the transmission of the payload to the intended destination, and/or requesting retransmission of the payload.

In some examples, the endpoint is an intermediate component on the path between the ingress port and the selected egress port. This allows an additional check at the intermediate component to be carried out to determine whether the end EDC matches the initial EDC. This allows errors to be detected before the payload reaches the selected egress port.

This can be particularly useful at a clock domain boundary in interconnection networks spanning multiple clock domains which operate with different clock signals which are misaligned in phase, frequency or both phase and frequency. Some downstream elements may rely on the relative timing between signals being fixed, but this can be harder to achieve when the signals are transmitted across a clock domain boundary which may introduce uncertainty in the timing at which a signal is sampled in the downstream clock domain relative to the signal in the upstream clock domain. Regenerating some signals in the downstream clock domain portion of a clock domain crossing can help address this problem, but may result in errors already present in the received signals used to regenerate the signals being propagated downstream, if no mitigating steps are taken. Hence, it may be desirable to perform an additional error check at the clock domain boundary, so that the clock domain crossing point at an intermediate point of the route across the network may effectively act as both an endpoint for the transmission in the upstream clock domain and a startpoint for a separate transmission in the downstream clock domain.

In some examples, the intermediate component is configured to select an actual version of a second route vector. The second route vector specifies a second route corresponding to a further portion of the path. The intermediate component is further configured to transmit the actual version of the second route vector with the payload. The intermediate component is further configured to obtain a second initial EDC calculated based on a pre-manipulated version of the second route vector. The pre-manipulation corresponds to a manipulation of the second route vector to be performed by at least one downstream component along the second route specified in the second route vector. The intermediate component is further configured to transmit the second initial EDC. This allows the intermediate component to act in a similar manner to the ingress port. A second route vector is selected to be used to route the payload along a further portion of the path and a second initial EDC is calculated and transmitted. The second initial EDC can then be used to determine errors in the transmission from the intermediate component along the second route.

In some examples, the second route vector specifies an endpoint for the second route. The endpoint for the second route comprises verification circuitry configured to calculate a second end EDC based on a version of the second route vector received with the payload from intermediate component. The verification circuitry is further configured to compare the second end EDC with the second initial EDC transmitted from the intermediate component. The verification circuitry is further configured to determine that an error has occurred when a mismatch is detected between the second end EDC and the second initial EDC. This allows errors to be detected specifically in the portion of the path specified in the second route vector, between the intermediate component and the endpoint for the second route.

In some examples, the ingress port is configured to transmit the initial EDC with the payload.

In some examples, the ingress port is configured to transmit the actual version of the route vector with the payload on a primary network and to transmit the initial EDC on a redundant network. This separates the transmission of the initial EDC from the transmission of the payload (either separation in time, or separation in physical space on the circuit layout, or both), and therefore allows increased robustness to errors by reducing the chance that a single error affects both primary and redundant packets.

In some examples, the redundant network and primary network may use physically separated transmission channels. This can increase robustness to errors.

In some examples, the redundant network and the primary network at least partially share a common transmission channel. For example, virtual channels may be provided on a single physical channel, where independent buffering and flow control of the primary and redundant transmissions can be provided to time-share the common channel between the primary and redundant transmissions. This reduces the network complexity and saves circuit area since an entirely separate topology for the primary and redundant networks is not required.

In some examples, the ingress port is configured to calculate the initial EDC based on the pre-manipulated version of the route vector and the additional information. In some examples, the additional information relates to payload. In some examples the additional information comprises at least a portion of the payload itself. This results in the initial EDC being specific to a given payload and route rather than solely based on the route vector. The EDC may also be calculated based on other additional information, such a virtual channel identifier or other lower-protocol-layer signals. This allows faults in the payload to be detected along with any errors in the transmission of the payload. By using a single EDC to protect both the payload and the route vector this can allow the total number of additional bits required for the EDC to be reduced compared to an example using two separate EDCs.

In other examples, the ingress port is configured to calculate a payload EDC based on the payload and to transmit the payload EDC and the initial EDC. Hence, in this case separate EDCs may be calculated for detecting errors in the route vector and payload respectively. This allows faults in the payload itself to be detected independently of detecting errors in the control of routing of the payload. An advantage of using an independently calculated EDC for protecting the payload can be that this means the initial EDC calculated for the pre-manipulated route vector can be pre-computed ahead of time, so does not need to be recalculated each time a new transmission is required. For example, the initial EDC for a given value of the route vector can be computed at design time and embedded in storage circuitry within the ingress port.

In some examples, the manipulation comprises a shift. Hence the manipulation required at each of the one or more routers is simple and quick to perform.

The technique discussed above can be implemented in a physical interconnection network which represents the actual component to be included in the integrated circuit.

However the technique can also be embodied within a non-transitory storage medium which stores an electronic design file representing a design of an interconnection network as discussed above. In general, the electronic design file may specify the components to be included in the interconnection network, including for example the ingress/egress ports and routers as discussed above. The electronic design file could represent the interconnection network at a low level, such as representing individual gates or transistors to be comprised by the interconnect, or could be represented at a higher level of abstraction, for example identifying certain basic blocks of components to be laid out within the interconnect, with each block corresponding to a certain known design of gates or transistors which can later be read by accessing a cell library which provides the gate level layout for each standard block. Using electronic design files to control the automated manufacture of integrated circuits can be useful because the number of transistors or gates in an integrated circuit in modern systems is so vast that a human designer is unlikely to be able to keep track of the detailed design of the overall system. By using the electronic design file the human designer can focus on higher level abstractions and design considerations, while the individual gate level representation can be filled in later by a computer based on previously prepared standard cells providing the gate level representation of basic blocks of components which can be combined in different combinations to provide the functionality required by the designer. The electronic design file can then be used to control the manufacturing equipment to actually manufacture the integrated circuit. Hence, in some cases the electronic design file may be provided by an integrated circuit developer to a manufacturer to instruct the manufacturer to manufacture their integrated circuit according to the specified design. Hence, the interconnection network represented within such a design may have any of the features discussed above embodied within the data structures of the design file.

The electronic design file defines the interconnection network comprising a plurality of ports. Each port exchanges data with a corresponding node of the integrated circuit and the ports include at least one ingress port and at least one egress port. Further, the method of generating the electronic design file comprises, for a given ingress port, selecting an egress port to which a payload received at the given ingress port is to be transmitted. One or more paths for routing the payload to the selected egress port are determined. For each of the one or more paths, an actual version of a route vector is generated, which specifies a route corresponding to at least a portion of the path. The route vector is manipulated, corresponding to a manipulation of the route vector performed along the route specified in the route vector, in order to generate a pre-manipulated version of the route vector. The electronic design file is generated or updated to indicate that the interconnection network comprises storage circuitry to store the actual version of the route vector and one of the pre-manipulated version of the route vector and an initial error detecting code (EDC) calculated based on the pre-manipulated version of the route vector. Hence storage circuitry containing route vectors for each path is created, thereby allowing route vectors for a given ingress and egress port pair to be looked up without having to calculate the route vectors for each request that is received at a given ingress port.

In some examples, the method also comprises generating or updating the electronic design file to indicate one or more routers. The manipulation of the route vector comprises one or more sequentially applied steps, and each of the one or more routers is configured to perform one of the one or more sequentially applied steps to the route vector. Hence a network topology of routers can be created and route vectors for creating routes between the ingress ports, egress ports and routers to be determined.

In some examples, the method also comprises selecting an arrangement of the one of more routers dependent on design specification data specifying nodes to be connected by the interconnection network.

FIG. 1 schematically illustrates an example of a data processing system 2 (e.g. an integrated circuit or system-on-chip) having data access routing circuitry 4, 6 for routing data access requests between requesting nodes and destination nodes and routing the responses to such data access requests from the destination nodes to the requesting nodes. In this example the system 2 includes a number of master devices, such as: one or more central processing units (CPUs) 7 or clusters of CPUs; a graphics processing unit (GPU) 8; a USB master 10 for controlling interaction with devices over a universal serial bus (USB); a PCIe controller 12 for controlling interaction with devices connected to the system 2 over a PCI Express bus; a digital signal processor (DSP) 14; a display controller and/or image signal processor 16; a video controller 18; a system controller 20, which could provide a number of system control functions such as controlling direct memory access operations, controlling security operations such as encryption or other on chip security operations, or controlling interaction with peripherals; and a modem system controller 22 for controlling communications via a modem. All of the masters 7 to 22 may be capable of acting as a requesting node for issuing data access requests to be serviced by a destination node of the system.

The system may have a number of components which may act as destination nodes, for example including a number of memory controllers 26 for controlling access to dynamic random access memory (DRAM); a memory controller 28 for controlling access to static random access memory (SRAM); a memory controller 30 for controlling access to a read only memory (ROM); a flash memory controller 32 for controlling access to flash memory; a peripheral controller 34 for controlling access to peripheral devices; and a network interface controller 36 for controlling interaction with remote devices or further peripherals via a network interface. Also the destination nodes may include a system cache 38 within the data routing circuitry 4, 6, which can cache some data from the memory system 26-36 so that some data access requests can be serviced without needing to pass them on to a downstream memory component.

In the example of FIG. 1, some of the masters 7, 8 are coupled via a cache coherent interconnection network 4 which is responsible for managing coherency between cached data held by the respective master's caches. The cache coherent interconnection network may have a snoop filter 40 for tracking data cached in particular masters' caches and may respond to read and write data access requests specifying a target address by issuing snoop transactions to check for the coherency status of data associated with the target address cached in other masters, so that if one master requests read or write access to data, then data for the same address in another master's cache can be invalidated, or if dirty, the latest value in that other master's cache can be provided to the requesting master and/or written back to the memory system. Any known coherency protocol could be used for the cache coherent interconnection network 4.

The other masters 10 to 22 (which may not comprise a cache) do not need to be connected via the cache coherent interconnection network 4. A system interconnection network 6 couples the outputs of the cache coherent interconnection network 4 and the non-cached masters 10 to 22 with the respective destination devices 26 to 36. The system interconnection network 6 is used for routing of transactions to a target destination node selected based on the target address specified by the request, and for routing of the responses back to the requesting node. In the arrangement shown in FIG. 1, the system interconnection network 6 does not need to take responsibility for management of coherency between cache data in respective masters. However, in other examples, instead of providing a separate cache coherent interconnect 4 and system interconnect 6 as shown in FIG. 1, a single interconnect similar to the system interconnect 6 could be provided which connects each of the master and slave devices and also manages cache coherency.

In this example, the system interconnection network 6 is implemented as a network on chip (NoC) which comprises a number of routers 44 for coupling a number of master interfaces 46 (from which data access requests, including read and write requests, can be received from respective master devices 7-22) to a number of destination interfaces 48 (for outputting the requests to respective destination devices 26-36). Each master interface 46 (also known as an ingress port, IP, or source endpoint) is responsible for decoding the address specified by the data access request to identify the particular route to be taken through the network on chip 6 via the routers 44 to reach a destination interface 48 associated with the selected destination node which is to service the data access request. In some cases the master interface 46 may also translate the protocol used for the request asserted to the network on chip 6 into an internal representation to be used for routing the request across the network on chip 6. If the requests are translated into an internal protocol, then the destination interfaces 48 (also known as egress ports, EP, or destination endpoints) may translate them back into the original protocol used by the request in order for servicing by the destination. Alternatively, some of the destination nodes may handle the request directly in the form used by the network on chip 6 so that no translation would be needed at the destination interface. For each destination interface 48, when it receives the response to a data access request from the destination node 26-36, the destination interface 48 issues that response back along the path taken by the corresponding request to the master interface 46 which issued the request, and the master interface 46 then returns the response to the requesting node.

A network on chip 6 as shown in FIG. 1 can be useful when there are a large number of master and destination devices to be connected, as the arrangement of routers 44 can be designed bespoke for the requirements of a given system in order to provide for an appropriate level of bandwidth and to provide sufficient number of routers that the physical distance over which requests have to be routed on the chip can be accommodated without significant loss of signal amplitude. For pairs of requesting and destination nodes which are expected to require a large amount of traffic then additional routers or signal channels can be provided between them, while other pairs of requesting/destination nodes may have less capacity.

The use of a network on chip is not essential and in other examples a different topology could be used within the system interconnection network 6. For example, a series of point to point connections between the master and destination interfaces could be used, or a ring topology may be used in which all requests are asserted onto a ring bus and then circulate round until they reach the required target interface. Also, a mesh topology could be used where each interface 46, 48 is connected to a point on a grid and requests and responses may traverse between the points on the grid associated with the corresponding master and destination interfaces 46, 48. However, use of a network on chip can enable better scaling as the number of master and destinations increases.

Figure 2:
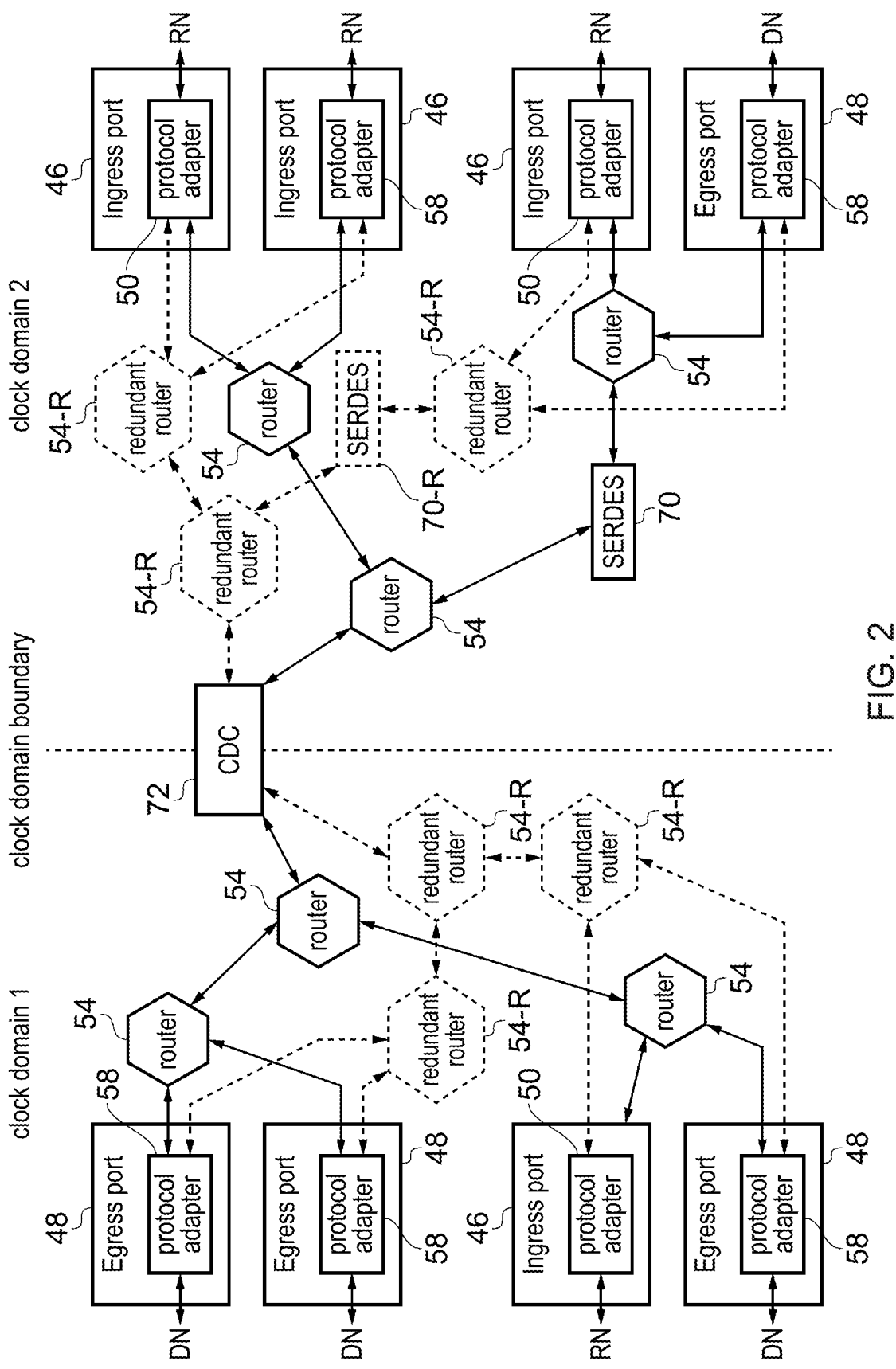
FIG. 2 shows an example of an interconnection network comprising a main network and a redundant network.

FIG. 2 shows an example of components on the network on chip (NoC) 6 in more detail. The NoC 6 comprises a number of components which can be combined in different layouts and arrangements depending on the particular arrangement of master devices and destination devices which are to be connected by the NoC 6. For example this may include any of the following components:

Ingress Port (Source Endpoint) 46

The ingress port receives data access requests from a requesting node coupled to the ingress port. For example the ingress port may act as one of the master interfaces 46 shown in FIG. 1. The ingress port 46 may decode a target address as specified by the data access request received from the requesting node to identify which egress port 48 should be selected for handling the request, and generates routing information for controlling the routing of the request across the NoC to the selected egress port 48. Also, as requests routed within the NoC 6 may use a different protocol to the protocol used by the requesting nodes for the data access requests, the ingress port may include a protocol adapter 50 for translating the request into the transport protocol used on the network. The ingress port 46 transmits the translated packets onto the network accompanied by routing information identifying how network packets corresponding to the request should be routed across the NoC. The ingress port 46 may also provide other functions such as managing resource allocation for particular requests, and controlling a quality of service level provided for requests from different sources so as to balance the competing needs of different master devices for bandwidth on the network. For example the ingress port 46 may have various buffers for buffering tracking information relating to requests and buffering responses to the requests. The ingress port 46 may control allocation of resource and issuing of requests based on availability of space in the buffers, and based on the quality of service requirements (e.g. providing a limit to the number of currently outstanding transactions that can be pending at a given time, or a limit to the number of transactions from a given requesting mode which are serviced within a given period).

Router 54

Each router 54 is responsible for routing packets received from one component of the NoC 6 and selecting which other component the packet should be directed to, based on the routing information specified by the packets which has been appended to the packet by the ingress port 46 at which the corresponding request originated. The particular arrangement and number of routers 54 that are provided may depend on the particular system requirements. For example, if ingress and egress ports are separated by a large distance on the integrated circuit then more routers may be required to provide sufficient repetition of packets to maintain signal level when the packets reach their destination. Also the topology in which the routers are connected may be selected based on expected bandwidth requirements for particular pairs of ports 46, 48.

Egress Port (Destination Endpoint) 48

The egress port 48 receives the network packets representing data access requests that were generated by the ingress port 46 and routed across the NoC via the routers 54. The egress port 48 has a protocol adapter 58 for translating the transport protocol of the network packets back into the protocol used by the destination node to which the egress report is connected. Some forms of request may not require a response from the destination node. However, for requests which do require a response (e.g. a read response, a write response or both), when a response to a data access request is received from the destination node which has serviced the data access request the responses can be adapted for the transport protocol of the network by the protocol adapter 58 in the egress port 48 and then output onto the network by the egress port 48. In some cases, the response packets may be routed back to the ingress port 46 which received the original data access request which triggered those responses, e.g. along a corresponding path to the one taken by the data access request packets but in the reverse direction, or on a different path. In other cases, the response packets may be routed to a different ingress port as they may sometimes need to be provided to a different requesting node to the requesting node that issued the original request (e.g. due to a change in coherency state in the caches of the respective masters). Hence again the protocol adapter 58 may append routing information specifying the route to be taken by the response packets. When these response packets are received at the ingress port 46, the protocol adapter 50 converts them into the responses expected by the requesting nodes and forwards them onto the requesting node.

Data Resizer 70

It may be needed to resize data values being transmitted across the network when being provided from one component to another. For example a data comprising a smaller number of flits could be spilt into a packet comprising a greater number of flits of a smaller data size, or a packet comprising smaller flits could have flits combined or repartitioned into a smaller number of flits of greater size. A "flit" (or flow digit) is the unit of data is the smallest unit of information for which the network can control routing independently from other flits. If the resizing is such that the number of input flits and the number of output flits follows a many-to-one or one-to-many relationship then the resizer 70 may act as a serialiser-deserialiser (SERDES) as shown in FIG. 2. However, it is also possible for resizers to provide an M:N resizing of data flits where both N and M are greater than 1, and in this case a more general resizer may be provided to map the data associated with a certain group of input flits to the data associated with a different number of output flits. In some embodiments, it may also be possible to convert a certain number of received packets to a different number of packets to be transmitted on the remaining part of the network.

Clock Domain Crossing (CDC) 72

As shown in FIG. 2, the NoC 6 may span multiple clock domains with components in one clock domain operating according to a clock signal which is different in one or both of the frequency and phase to the clock controlling the components in another clock domain. For example, the respective clock signals in the different clock domains could be asynchronous signals which have different clock frequencies, or could be mesochronous clock signals which have the same frequency but are offset in phase. At a clock domain boundary, the misaligned clocks mean that simply connecting the signal in the upstream domain to the corresponding signal path in the downstream domain could risk the downstream domain sampling the signal at the wrong timing relative to the clock of the source domain. The CDC 72 can provide buffers (one on the upstream domain side and another on the downstream domain side) for temporarily storing the transmitted information to allow the downstream domain to sample the received data at the correct timing relative to its clock. An asynchronous hand shake mechanism may be used to control the timing when data passes from the upstream buffer to the downstream buffer, so that the data can safely be transmitted over the clock domain boundary.

Redundant Network Components

As shown in FIG. 2, in addition to the components 54, 70, 72 defining the primary network for routing of primary payloads across the NoC, the NoC also comprises a redundant network which partially duplicates at least some of the primary network components of the primary network. For example, in FIG. 2 the network includes a number of redundant routers 54-R which mirror the corresponding main routers 54 of the primary network. Also the data resizer 70 of the main network may have a corresponding redundant network data resizer 70-R. The clock domain crossing 72 may have both main and redundant channels within it to allow the main and redundant signals to bridge across the clock domain boundary, but may also include cross-checking circuitry to check the redundantly transmitted payload against the primary payload at the CDC 72. The ingress ports 46 and egress ports 48 include primary and redundant components corresponding to the primary and redundant payloads. By providing a redundant network which provides redundant information which at least partially replicates information travelling on the primary network, this can be used for error checking at the egress ports 48 to determine whether a permanent or transient fault has occurred during routing of the primary payload or the redundant payload which may potentially cause incorrect operation.

It will be appreciated that the network-on-chip 6 could also include other components not shown in FIG. 2.

One approach for implementing redundancy for functional safety purposes could be for the redundant network to duplicate each component the primary network and route, as the redundant payload, an exact copy of the primary payload. However, this may be expensive in terms of additional processing logic and circuit area as each redundant router 54-R and other redundant components 70-R may have to be expanded, and as there are many such components in a typical NoC, this may cause a great increase in circuit area. In other examples, the redundant payload sent over the redundant network may include an error detecting code derived from information associated with the primary payload, which has a reduced number of bits (e.g. the EDC can be derived from the payload itself and/or control signals such as a pre-manipulated route vector as discussed below).

In the example illustrated in FIG. 2, for conciseness only, the path of the network linking the source endpoint to the destination endpoint is shown (clearly the network will also comprise other paths linking other pairs of endpoints). Also, for conciseness in this example the network components are shown as a sequence of routers 54 for selecting which downstream path to send the payload to, but it will be appreciated that the network path could also include other types of network component. Also, in some network implementations which provide at least some point-to-point connections directly linking a corresponding pair of endpoints, such point-to-point paths may not include any routers between the endpoints.

In addition to the payload data the primary network may also transmit network control information which is used for controlling the routing of the primary payload across the network. For example these control signals may specify a route vector which specifies a route corresponding to at least a portion of a path along which the payload should be routed to reach the destination endpoint. For example, the route vector may identify a specific sequence of routers (or other network components) to be traversed by the payload as it crosses the network, and/or information defining the size or format of the packets transmitted.

The redundant network transmits a redundant payload which is delayed relative to the corresponding primary payload being transmitted on the primary network. Rather than duplicating the entire primary payload as the redundant payload, the redundant payload comprises at least a subset of the network control signals used for controlling routing of the payload. In other examples no delay may be provided between the primary and redundant transmissions, as in some cases the physical separation of the two channels may be enough to provide robustness against common mode failures (a common mode failure occurs when a single cause of fault, such as a particle strike, results in errors in both the primary payload and the related redundant payload). For example, if the corresponding components of the redundant and primary networks are physically remote on the system chip then this may reduce the vulnerability to common mode failures.

While FIG. 2 shows an example where the redundant network has the same topology as the primary network, this is also not essential and in some cases the redundant network could take a different topology. In this case there may be some difference between the network control signals provided on the primary and redundant networks. For example a route vector indicating the sequence of routers to be traversed may be different on the redundant network compared to the primary network. While FIG. 2 shows the redundant network as a physically separate channel from the main network, this is not essential, and in some cases the redundant network could at least partially reuse the same physical channel used for the main network, for example the redundant network and the primary network could at least partially share a common transmission channel. In this case, each router 54 or other network component could have separate redundant and primary buffers for independently buffering the redundant payload and primary payload respectively, so that independent flow control can be applied to control when the bandwidth on the common channel is used for the redundant payload and the primary payload respectively.

Figure 3:
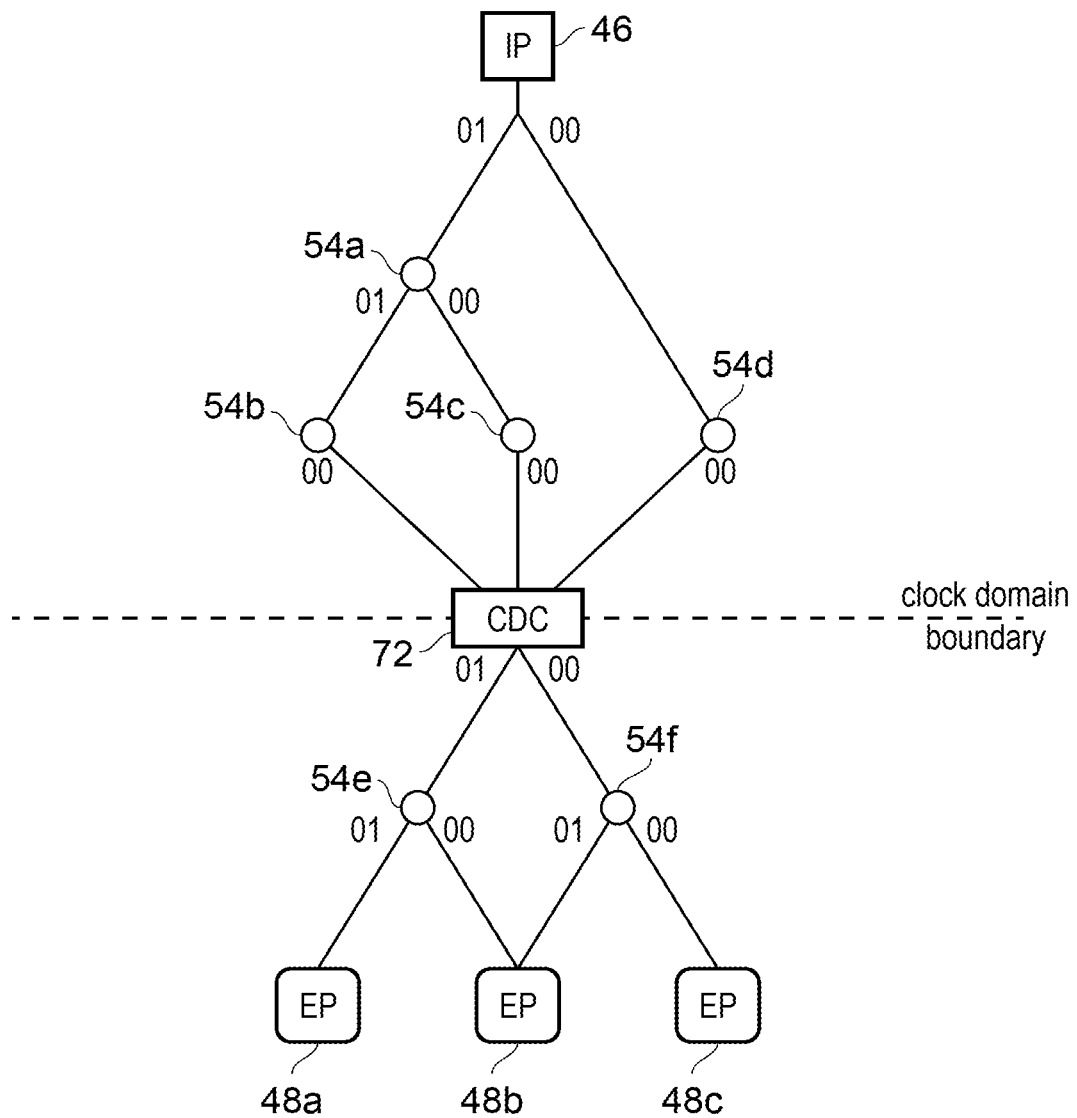
FIG. 3 shows an example of routes across an interconnection network from an ingress port.

FIG. 3 shows an example of routes across an interconnection network from a particular ingress port, for example an ingress port 46 as described above in relation to FIG. 2. The ingress port 46 is connected to three egress ports 48a-c by routers 54a-f and the CDC 72. In the illustrated example, there are numerous paths a packet could take to reach a given egress port 48. For example, to reach egress port 48b, the packet could take a path from the ingress port 46 via routers 54a, 54b, CDC 72 and router 54e. Alternatively, the packet could take a path from the ingress port 46 via router 54d, CDC 72 and router 54f. It can be seen from FIG. 3 that there are 6 different paths between the ingress port 46 and egress port 48b. Equally, there are 3 different paths between the ingress port 46 and egress port 48a, and 3 different paths between the ingress port 46 and egress port 48a.

In response to receiving a request to transmit a payload to a selected egress port 48b, route selection circuitry within the ingress port 46 is configured to select an actual version of a route vector. The route vector specifies the route along which the payload is to be routed in order to reach the selected egress port 48b. In some examples, the actual version of the route vector defines the entire path from the ingress route 46 to the selected egress port 48b, whilst in other examples the actual version of the route vector defines a portion of the path from the ingress route 46 to the selected egress port 48b. For example, the entire path from the ingress route 46 to the selected egress port 48b may flow from the ingress port 46 via routers 54a and 54b, the CDC 72 and router 54e, with the endpoint specified in the route vector being selected egress port 48b. In this case, the actual version of the route vector would be 0001000101, since the path from ingress port 46 to router 54a is designated as 01 (corresponding to the least significant two bits of the overall route vector), the path from router 54a to router 54b is designated as 01 (corresponding to the next least significant two bits), the path from router 54b to the CDC 72 is designated as 00, the path from the CDC to router 54e is designated as 01, and the path from router 54e to the selected egress port 48b is designated as 00. Whilst in the examples in FIG. 3 each path between nodes of the interconnection network are designated using 2 bits, it will be appreciated that any number of bits may be used to designate a path, for example 1, 4 or 8, depending on the maximum number of downstream paths which can be selected by a given router. Additionally, different nodes of the interconnection network may use a different number of bits to designate the paths originating from that node. However, providing each router with the same number of bits for designating downstream paths can simply design of the NoC by permitting each router to have exactly the same circuit design.

In some cases, the endpoint specified in the route vector may be an intermediate component on the path between the ingress port and the selected egress port. For example, in some networks having a clock domain crossing (CDC) 72, such as the ones illustrated in FIGS. 2 and 3, the endpoint specified in the route vector may be the CDC 72. This is because, in order to implement a lockstep functionality in components downstream of the CDC, it may be useful to regenerate the redundant signal in the downstream clock domain side of the CDC 72. The delay between the primary and the redundant transmissions may need to remain constant at components operating in lockstep, so that it can trusted that the comparison logic is actually comparing the related primary and redundant payloads (rather than payloads corresponding to different information). When signals cross a clock domain boundary, the misaligned clocks mean that the timing of sampling the redundant payload in the downstream domain may vary relative to the sampling of the primary payload. By regenerating the check code at the CDC in the downstream clock domain, the relative delay between the main and redundant payloads can be restored.

If the CDC 72 is specified as the endpoint in the route vector, the actual version of the route vector may only specify the portion of the path from the ingress port 46 to the CDC 72. In this case, the actual version of the route vector generated by the ingress port would be 000101 for the route described above (and the CDC 72 may generate a further route vector 0001 for the remaining portion of the route to the selected egress port 48b).

The route vector may be stored in a table, such as a routing table in the ingress port 46. The routing table indicates, for each of the egress ports 48a-c connected to the ingress port 46, the possible routing vectors that could be used to route a payload from the ingress port 46 to the given egress port 48a-c. The routing table may only contain entries for the egress ports 48a-c the ingress port 46 is directly connected to, or may only contain entries for some of the egress ports 48a-c the ingress port 46 is directly connected to, such as those that the ingress port 46 is most likely to send signals to. The route selection circuitry is then configured to select an actual version of a route vector by performing a look-up operation on the routing table and selecting an appropriate route vector from the table for the selected egress port 48b.

Having selected the actual version of the route vector, the ingress port 46 uses the actual version of the route vector to determine which of the downstream paths to route the payload down, for example using one or more of the least significant bits in the actual version of the route vector. In the example illustrated in FIG. 3, when the route vector designates the CDC 72 as the endpoint for the route along the path from the ingress port 46 to the selected egress port 48b, the actual version of the route vector is 000101. The 2 least significant bits, 01, are then used to determine which of the downstream paths to route the payload down. The ingress port then transmits the actual version of the route vector with the payload along the downstream path specified in the actual version of the route vector. In the present example, the ingress port 46 transmits the payload with the actual version of the route vector, down the downstream path corresponding to the designation 01, to the router 54a.

The router 54a is configured to perform a manipulation, such as a shift or a rotation, of the route vector. In the present example, the router 54a performs a 2 bit rotation of the route vector. Accordingly, the route vector received at the router 54a, 000101, is rotated to form a manipulated route vector of 010001. It will be appreciated that other sizes of rotation and shift are also possible, such as a single bit rotation or shift or a more than 2 bit rotation or shift. The router 54a is then configured to select a downstream path to route the payload down based on the manipulated route vector. Since the two least significant bits in the manipulated route vector are 01, the router 54a routes the payload with the manipulated route vector down the path to router 54b.

A similar process then occurs at router 54b. The route vector received with the payload at router 54b is manipulated with a 2 bit rotation to create a new manipulated route vector, 010100. The router 54b then selects a downstream path to route the payload down based on the manipulated route vector, in this case the CDC 72 since the two least significant bits in the manipulated route vector are 00. It will be appreciated that, whilst in this example the same manipulation is applied at each of the routers 54a, 54b along the route, the routers may be configured to perform different manipulations. For example, some of the routers may perform a one bit rotation whilst other routers perform a 2 bit rotation or a two bit shift (with the shift matching the number of bits which that router used to select which downstream path was taken), or each router may be configured to perform a different manipulation from each of the other routers.

When the payload reaches the CDC 72, which is the endpoint for the route vector in the present example, the version of the route vector received with the payload at the endpoint is 010100. This is different from the actual version of the route vector selected at the ingress port 46, which was 000101. Were an error detecting code (EDC) to be calculated based on the route vector received with the payload at the endpoint and compared against an EDC calculated based on the actual version of the route vector, they would not be the same and it would not be possible to detect that an error has occurred related to the transmission of the payload.

In order to be able to detect errors related to the transmission of the payload, a pre-manipulated version of the route vector is derived from the actual version of the route vector at the ingress port 46 (or the pre-manipulated version of the route vector is calculated in advance, e.g. at design time, and embedded in the same table as the route vector itself). The pre-manipulation corresponds to the manipulation of the route vector that is performed at the downstream components along the route from the ingress port 46 to the endpoint designated in the route vector. In the example above, the actual version of the route vector, 000101, defines the route the payload should take. The manipulation to the route vector that is to be performed at each router along this route can be determined and applied to the initial version of the route vector in order to generate the pre-manipulated version of the route vector, 010100. In other words, the pre-manipulated version of the route vector is generated by determining how the route vector will be manipulated as the route vector travels with the payload along the path to the endpoint specified in the route vector without having to perform any transmissions. The pre-manipulated version of the route vector will therefore match the version of the route vector received with the payload at the endpoint if no errors occur. An initial EDC can then be calculated based on the pre-manipulated version of the pre-manipulated version of the route vector. In some cases, the initial EDC is calculated based on the payload and the pre-manipulated version of the route vector. The EDC may also be calculated based on other additional information, such as a virtual channel identifier or other lower-protocol-layer signals. Alternatively, the ingress port 46 may be configured to calculate a separate payload EDC based on the payload and to transmit the payload EDC and the initial EDC, either together or in separate transmissions. The term EDC is understood to mean any form of code that is capable of detecting an error, and may include code capable of reconstructing the originally transmitted data, such as error correction code (ECC).

The ingress port 46 is configured to obtain the initial EDC. For example, the routing table may contain an entry for the actual version of the route vector and a corresponding entry for the pre-manipulated version of the route vector. The ingress port 46 is then configured obtain the initial EDC by calculating the initial EDC based on the pre-manipulated version of the route vector obtained from the routing table. This case allows the EDC to be calculated based on other factors as well as the pre-manipulated version of the route vector, such as the payload, or lower-protocol-layer signals such as a virtual channel identifier. Alternatively, if the EDC is to be calculated independent of any parameter which varies from transmission to transmission, the routing table may also contain, in addition to or instead of an entry for the pre-manipulated version of the route vector, an entry for the initial EDC. In this case, the ingress port 46 then configured to obtain the initial EDC from the routing table. Hence, in this case the initial EDC could be pre-computed (e.g. at design time) for each egress port or intermediate point (CDC) which can be reached from the ingress port, and stored in the routing table in advance as part of the design configuration of the ingress port.

The ingress port is then configured to transmit the initial EDC. For example, the initial EDC could be transmitted with the payload. Alternatively, the initial EDC could be transmitted separately from the payload on the same primary network as the payload but at a different time. In some network implementations, the primary network is used to transmit the actual version of the route vector with primary payload from the source endpoint (ingress port) 46 to the destination endpoint (egress port 48) whilst the redundant network is used to transmit an initial EDC from the source endpoint (ingress port 46) to the destination endpoint (egress port 48).

Where the initial EDC is transmitted separately from the payload, if the initial EDC is to be routed along the same route as the payload, the ingress port 46 uses the same actual version of the route vector as used to route the payload and the initial EDC. Equally, if the redundant network and the primary network have the same topology, the same actual version of the route vector can be used to route the initial EDC along the redundant network. If the initial EDC is to be transmitted along a separate route from the payload, the route selection circuitry in the ingress port 46 is configured to select another actual version of a route vector as described above in order to specify the path along which the initial EDC should be routed. This path may on the primary network or the redundant network. In each case, the version of the route vector used to route the initial EDC is then transmitted by the ingress port 46 with the initial EDC.

In some examples the initial EDC comprises a type of EDC capable of detecting multi-bit errors. For example, the initial EDC may be a checksum, an ECC or a convolutional code, for example a cyclic redundancy check (CRC) code calculated based on the pre-manipulated version of the route vector. A CRC with a relatively small number of bits, such as 6 or 8 bits can provide a sufficiently high probability of detecting both single-bit errors and multiple bit errors to enable the interconnection network to comply with the higher classes of functional safety certification needed for applications such as automotive processes. It will be appreciated that other types of error checking codes could be used other than CRC's but in general a form of code should be selected that is capable of detecting multiple erroneous bits which are incorrect within the same data value (e.g. a parity code may not be sufficient).

When the payload reaches an endpoint, the end EDC is calculated based on the version of the route vector received with the payload based on the same EDC-calculating function as used to calculate the initial EDC. The end EDC can then be compared against the initial EDC transmitted from the origin of the payload, such as the ingress port or an intermediate component. Additionally, an identifier for the endpoint can be compared against a destination identifier expressed in the payload in order to determine that the payload has been delivered to the correct endpoint. If there is a difference or mismatch between the identifier for the endpoint and the destination identifier expressed in the payload, it is determined that the payload has been transmitted to the wrong endpoint or destination.

If there is a difference or mismatch between the end EDC and the initial EDC then it is determined that an error has occurred with the transmission of the payload and appropriate action can be taken, such as signalling a fault and a fault handling response triggered. For example, the fault handling response may comprise requesting retransmission of the data, or signalling that an error has occurred to the requesting node that initiated the request. In some implementations, it may not be necessary to signal the fault to the requesting node (or even to the source ingress port) when an error is detected. For example, in some systems (e.g. automotive) it may not be necessary to actually correct the error, as long as any incorrect actions triggered by the erroneous values are halted, as updated values may be transmitted periodically during real time system control, and so if a value detected at one time, is incorrect the system may continue based on the previously transmitted values until the next time an updated value is transmitted. Hence, in some cases the fault handling response taken may simply be to prevent the erroneous value being written to an actuator for triggering an action. Also, in some cases the fault handling response may be to update an error log tracking errors that have occurred.

In the cases where the endpoint for the route vector obtained at the ingress port 46 is an intermediate component, the intermediate component is configured to perform a similar operation to the one described above in order to route the payload to the next endpoint, which may be the selected egress port 48b or another intermediate component. For example, as illustrated in FIG. 3, there are two paths between the CDC 72 and the selected egress port 46b. The CDC 72, an intermediate component in this case, is configured to select an actual version of a second route vector in a similar manner to that described above in relation to the ingress port 46. The second route vector specifies a second route corresponding to a further portion of the path between the ingress port 46 and the selected egress port 46b. For example the route vector 0001 defines the path from the CDC 72 to the router 54e to the selected egress port 46b whilst the route vector 0100 defines the path from the CDC 72 to the router 54f to the selected egress port 46b. As described above in relation to the ingress port 46, the CDC 72 is configured to transmit the actual version of the second route vector with the payload along the downstream path specified in the actual version of the second route vector. The CDC 72 obtains a second initial EDC calculated based on a pre-manipulated version of the second vector. In the same manner as described above, the pre-manipulation corresponds to a manipulation of the second route vector to be performed by at least one downstream component along the second route specified in the second route vector. The CDC 72 may contain a routing table similar to the routing table of the ingress port 46, and the second initial EDC may be obtained in a similar manner using the routing table contained in the CDC 72. The CDC 72 is configured to transmit the second initial EDC. The second initial EDC may be transmitted with the payload, or separately from the payload on either the primary or the redundant networks. Where the second initial EDC is transmitted separately from the payload, a routing vector for the second initial EDC is also obtained, for example from the routing table contained in the CDC 72.

The second route vector specifies an endpoint for the second route, which could be the selected egress port 46b or another intermediate component. The endpoint specified in the second route vector comprises verification circuitry to perform the EDC verification operations described above in relation to the CDC 72. For example, the EDC verification circuitry is configured to calculate a second end EDC based on a version of the second route vector received with the payload from intermediate component. The second end EDC is compared with the second initial EDC transmitted from the intermediate component. An error is determined to have occurred when a mismatch is detected between the second end EDC and the second initial EDC.

Where the endpoint for the second route is a further intermediate components, the intermediate components is configured as described above to select a further route vector to route the payload along a portion of the path between the ingress port 46 and the selected egress port 48b. The payload, route vectors and EDCs are then transmitted as described above, potentially to multiple further intermediate components which are configured as described above until the payload reaches the selected egress port 48b. The payload is then transmitted the destination node. At each intermediate component along the path and at the egress port, an end EDC based on a version of the route vector received with the payload is calculated and compared with the received initial EDC. An error is determined to have occurred when a mismatch is detected between the end EDC and the received initial EDC. This allows errors to be detected at multiple points along the path between the ingress port 46 and the selected egress port 48*b* and for appropriate action to be taken as described above.

In the example illustrated in the FIG. 3, the CDC 72 acts as an intermediate component along the path between the ingress port 46 and the selected egress port 48*b*. The functionality of an intermediate component described above allows an additional check to be performed to check whether any error has occurred in the portion of the network leading to the CDC 72. To ensure predictable relative signal timings in the downstream clock domain which may be needed for lockstep components or for other comparison operations which assume a fixed timing, new check codes may be generated at the CDC 72 based on signals received at the CDC from the upstream part of the route. Therefore, an additional error check of the EDCs may be required at the CDC to check the regenerated EDC can be trusted (as otherwise any previously occurring error arising in the upstream part of the route leading up to the CDC 72 may not be detected at the selected egress port 48*b*). As the CDC is performing comparisons of the initial EDC and regenerated EDC, the pre-manipulated version of the route vector used for the initial EDC should reflect the form of the route vector as seen by the CDC, i.e. manipulated based on the sequence of paths taken to reach the CDC 72, rather than the overall route to the egress port.

The intermediate component, such as the CDC 72, effectively acts as both a destination endpoint (checking the route vector received from the actual source endpoint) and a source endpoint (generating a second initial EDC to transmit to the actual destination endpoint), effectively dividing the overall path taken into multiple sections each with a separate route vectors and initial EDC generation, transmission and checking. Hence, in some cases the CDC 72 could be regarded as a source endpoint or destination endpoint. The intermediate component could be configured to only perform the source endpoint operations (generating a second initial EDC and transmitting the payload) if no error is detected.

Figure 4:
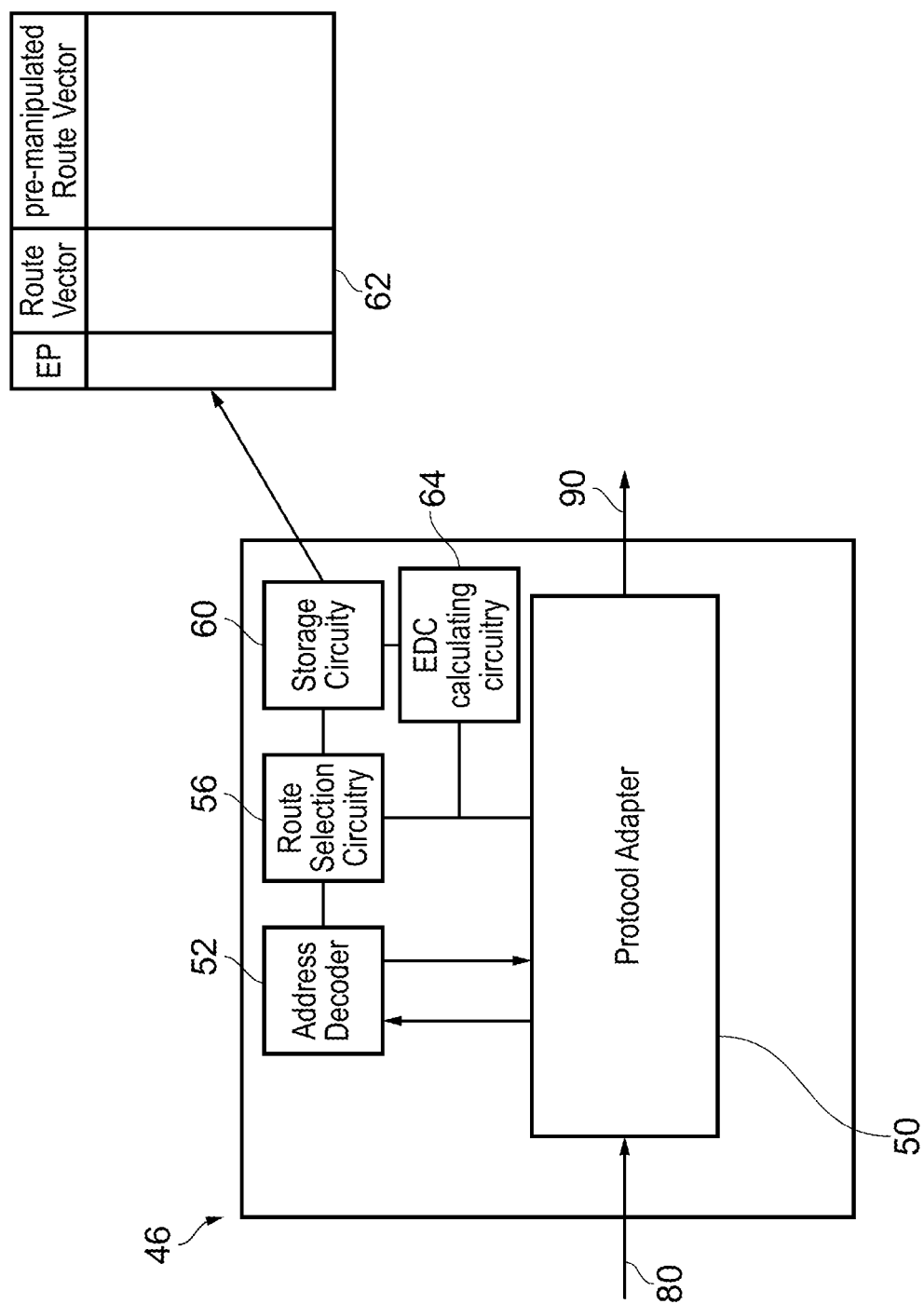
FIG. 4 shows an example of an ingress port of an interconnection network.

FIG. 4 shows an example of an ingress port 46 of an interconnection network. The protocol adapter 50 receives requests 80 from requesting nodes. As described above, the protocol adapter translates the requests into the transport protocol used on the network. The ingress port 46 also comprises an address decoder, which determines, based on the target address specified in the request, which destination interface (for example an egress port 48) the payload is to be routed to. As described above, the ingress port 46 also comprises route selection circuitry 56 which is configured to select an actual version of a route vector based on the selected egress port 48 determined by the address decoder 52.

The ingress port 46 transmits the translated packets 90 onto the network with the actual version of the routing vector along the downstream path specified in the routing vector. Although not illustrated, the ingress port 46 may comprise a read channel for handling read requests and a separate write channel for handling write requests. Alternatively, the ingress port 46 may comprise a combined read and write request channel. The ingress port 46 may also comprise other channels such as response channels, a snoop request channel in a cache coherent interconnect, debug or trace channels.

As described above, the route vector may be stored in a table in the ingress port 46. In the example illustrated in FIG. 4, the ingress port 46 comprises storage circuitry 60 which stores the routing table 62. The routing table 62 indicates, for each of the egress ports 48 connected to the ingress port 46, the possible routing vectors that could be used to route a payload from the ingress port 46 to the given egress port 48. In some cases, it may be preferred to reduce the number of routing table entries by restricting each egress port to being reached by one particular route (even if it would be possible to reach that egress port by a number of alternative routes). The routing table may only contain entries for egress ports 48 the ingress port 46 is connected to, or may only contain entries for some of the egress ports 48 the ingress port 46 is connected to. The route selection circuitry 56 is configured to select an actual version of a route vector by performing a look-up operation on the routing table 62 and selecting an appropriate route vector from the table for the selected egress port 48. The example routing table 62 illustrated in FIG. 4 also contains a corresponding pre-manipulated version of the routing vector entry for each actual version of the routing vector in the route table 62. Alternatively, the routing table 62 could have a corresponding initial EDC entry for each actual version of the routing vector instead of the pre-manipulated version of the routing vector. The ingress port 46 may also contain EDC calculating circuitry 64 for generating the EDC from the pre-manipulated route vector (and optionally the payload and other information associated with the payload), but this is not essential. For example, the EDC calculating circuitry could be omitted from an ingress port 46 in cases where the initial EDC is contained as an entry within in the routing table 62.

Although the ingress port 46 illustrated in FIG. 4 has storage circuitry 60 containing the route table 62, this is not essential. Alternatively, the storage circuitry could be centrally located on a separate node within the interconnection network. In this case, the route table 62 could contain a set of entries for every ingress port 46 in the NoC 6, or a sub-group of ingress ports 46 in the NoC 6. This reduces the need to maintain a separate route table at each ingress port 46, but results in a larger route table as every possible route vector for every ingress-egress port pairing needs to be contained in a single table. This could also cause congestion as the route selection circuitry 56 of each ingress port 46 needs to access the same table. Hence, in some cases it may be preferred to provide a distributed routing table where each ingress port includes local storage for storing the routing table entries relevant to that ingress port.

Figure 5:
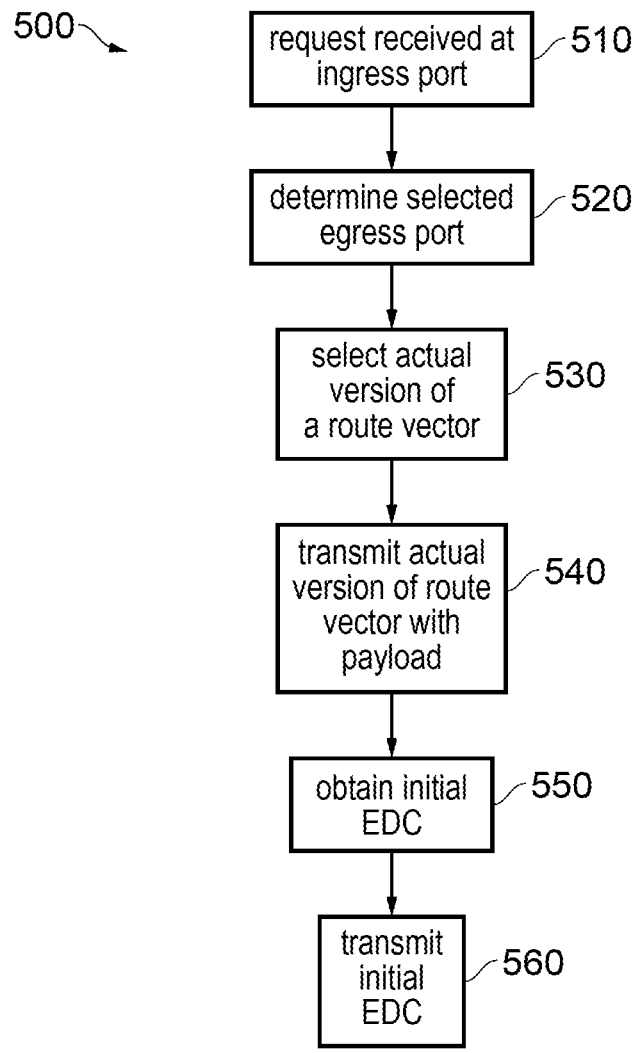
FIG. 5 shows a flow diagram illustrating a method of transmitting a payload in an interconnection network.

FIG. 5 shows a flow diagram illustrating a method 500 of transmitting a payload in an interconnection network. The method 500 may be performed by an ingress port of the interconnection network, such an ingress port 46 of the system interconnection network (NoC) 6 discussed above. The method 500 starts at step 510 where the ingress port receives a request from a requesting node to transmit a payload to a destination node. At step 520, the selected egress port via which the payload is to be routed to the destination node is determined. At step 530, an actual version of a route vector is selected. As described above, the route vector specifies a route corresponding to at least a portion of a path along which the payload should be routed to reach the selected egress port. At step 540, the actual version of the route vector is transmitted with the payload. At step 550, an initial EDC is obtained. As described above, the initial EDC is calculated based on a pre-manipulated version of the route vector, and the pre-manipulation corresponds to a manipulation of the route vector to be performed by at least one downstream component along the route specified in the route vector. At step 560, the initial EDC is transmitted.

Figure 6:
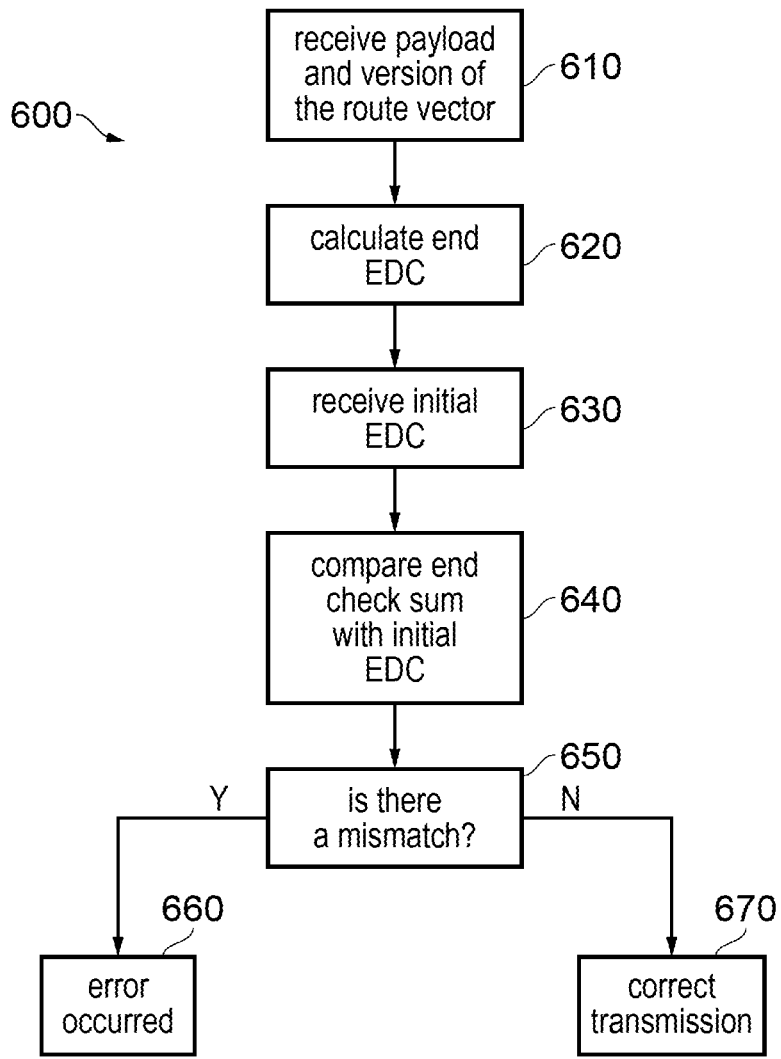
FIG. 6 shows a flow diagram illustrating a method of determining that an error has occurred in the transmission of a payload in an interconnection network.

FIG. 6 shows a flow diagram illustrating a method 600 of determining that an error has occurred in the transmission of a payload in an interconnection network. The method 600 may be performed by verification circuitry of an endpoint in the interconnection network, such as an egress port 48 or CDC 72 of the system interconnection network (NoC) 6 discussed above. As discussed above, the endpoint may be the selected egress port the payload is to be routed to, or an intermediate component on the path between the ingress port and the selected egress port. The method 600 starts at step 610, where the endpoint receives the payload and a version of the route vector. At step 620, an end EDC is calculated based on the received version of the route vector. At step 630, the endpoint receives the initial EDC originally obtained and transmitted by the ingress port. At step 640, the end EDC calculated by the endpoint is compared with the initial EDC transmitted from the ingress port. At step 650, it is determined whether there is a difference between the end EDC and the initial EDC. If there is a difference, the method 600 continues to step 660, where it is determined that an error has occurred. If there is no difference between the end EDC and the initial EDC (i.e. they are identical), the method 600 continues to step 670, where it is determined that a correct transmission of the payload occurred. If an error is detected at step 660 then a fault handling response can be triggered, such as signalling an exception or interrupt, or returning a signal to the ingress port or requesting node requesting retransmission of the payload. The fault handling response may comprise signalling that the error has occurred to a separate error-handling component.

Figure 7:
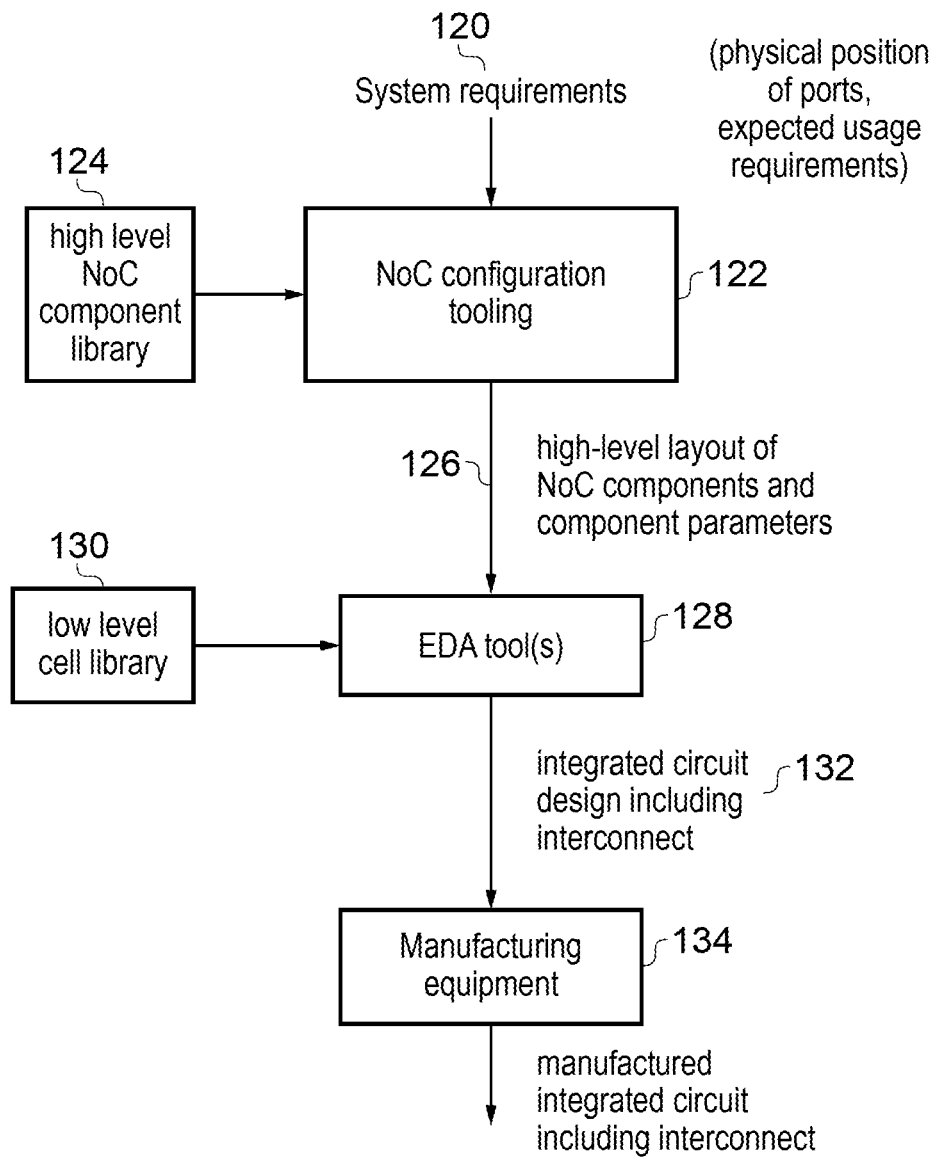
FIG. 7 schematically illustrates design and manufacture of an integrated circuit including an interconnect.

FIG. 7 schematically illustrates an example of an electronic design process which may use automated design techniques to simplify the design process. A system designer or an electronic design tool performing an earlier stage of the design process may specify various system requirements 120, such as the physical position of the ports 46, 48 to be used for the integrated circuits interconnect, and/or expected usage requirements (e.g. which pairs of ports are likely to require communication links between them and the expected level of bandwidth for different pairs of ports depending on expected data traffic or prioritisation of different masters relative to each other). A NoC configuration tooling program 122 executed on a data processing apparatus may use the system requirements, together with a component library 124 providing a high level representation of the various NoC components which can be selected for assembling the NoC, to generate an electronic design file 126 which provides a high level layout of the NoC components and specifies various parameters of those components such as parameters for configuring the particular properties of the components.

For example, the component library 124 could specify a range of components, such as the ingress port 46, egress port 48, routers 54, or resizers 70 and corresponding redundant network components as discussed above with respect to FIG. 2. For some of these types of component, multiple alternative types could be specified in the component library for selection depending on the particular needs of the system requirements. Alternatively a single type of component could be provided but the NoC configuration tooling 122 may specify, as properties of a given component, certain variables which may tune behaviour of a given component of the NoC or control how that component is manufactured. For example, the parameters for an ingress port could specify the size of the interface with the corresponding requesting node, a subset of destination ports for which routing of network traffic is expected to be needed, a packet format to be used for packets routed to particular destinations, etc. The NoC configuration tooling 122 may determine such requirements based on the system requirements that were input. Part of the NoC configuration function may be to lay out the high level configuration of the redundant network to be provided for functional safety checking, the check code generation at the ingress port and the error checking logic to be provided at the egress port. For example, a special "functional safety providing" version of the ingress port 46 and egress port 48 may be selected (as opposed to alternative versions of the ingress port 46 and egress port 48 which may be selected when generating a NoC design for a system not requiring functional safety). Similar decisions could be activated for other network components, depending on the level of functional safety specified as being required in the system requirements 120. The NoC configuration tooling 122 may also generate the pre-manipulated route vector and/or initial error detecting code for each egress port which can be reached from a given ingress port, and include storage within the design of the ingress port for storing the determined parameters.

The high level layout file 126 generated by the NoC configuration tooling 122 is provided to an electronic design automation (EDA) tool 128 which uses a low level cell library 130 specifying standard cells of integrated circuit components at a more detailed level than the NoC component library 124, and generates an integrated circuit design file 132 which specifies the particular gates or transistors to be generated for the integrated circuit which includes the interconnection network designed by the NOC configuration tooling 122. In some cases the EDA 128 may actually comprise a number of tools which gradually iterate the design to produce more and more detailed circuit-level representations. The EDA tools 128 may also carry out timing analysis to check whether the designed circuit would meet its timing requirements (testing for setup and hold violations for example), and may iterate the design if earlier attempts fail the timing analysis. The eventually prepared integrated circuit design represented by the design file 132 is the provided to a manufacturer who uses the design file to control manufacturing equipment 134 to manufacture the integrated circuit with the required connections between transistors in order to implement an integrated circuit including the interconnect.

Figure 8:
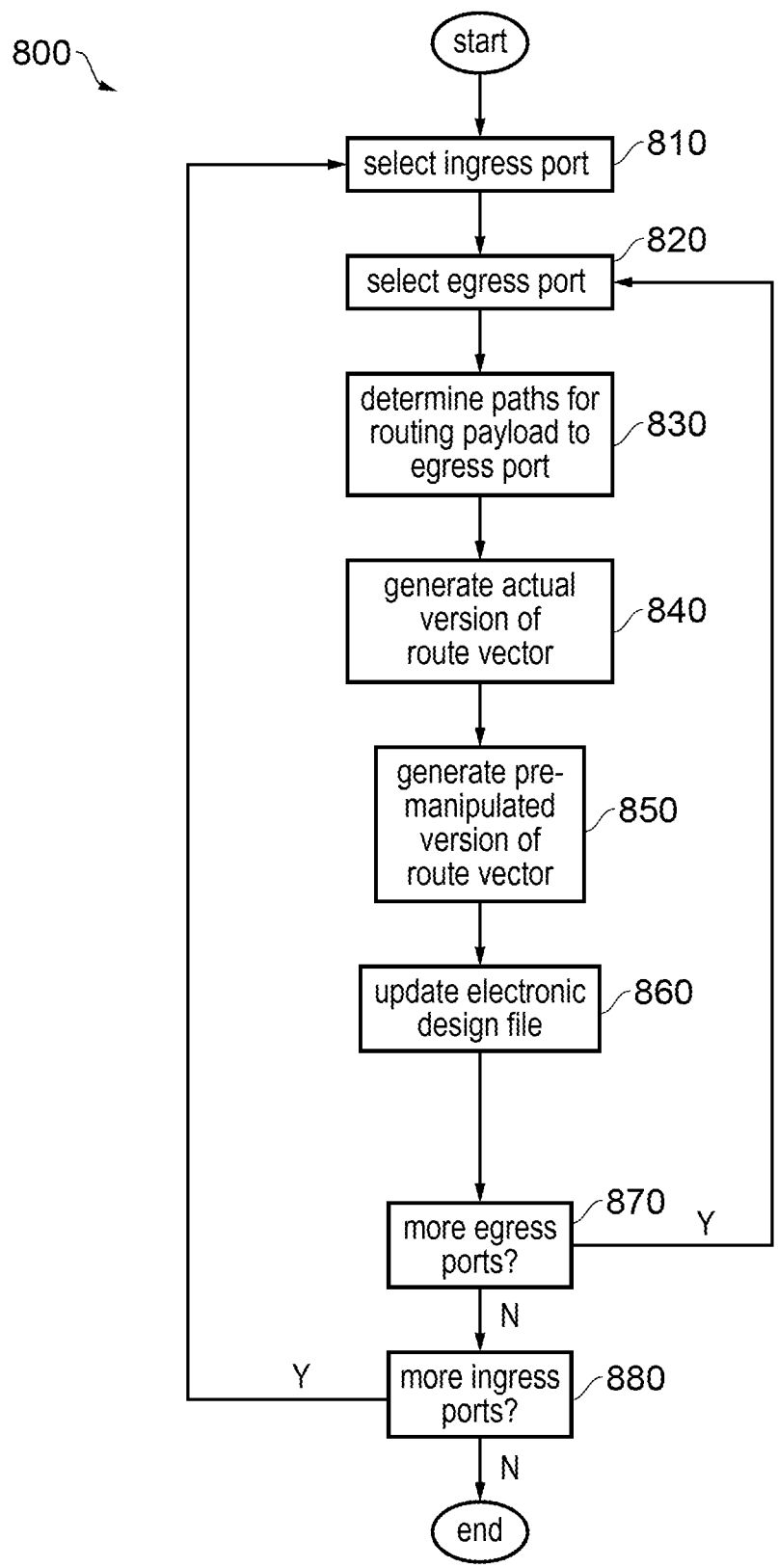
FIG. 8 is a flow diagram illustrating a method of generating an electronic design file representing a design of an interconnection network.

FIG. 8 shows a flow diagram illustrating a method 800 of generating an electronic design file representing a design of an interconnection network, such as the system interconnection network (NoC) 6 discussed above. The method 800 may be performed by the NoC configuration tooling 122 during the design process of FIG. 7. The method 800 begins at step 810 where an ingress port is selected. At step 820 an egress port is selected to which a payload received at the given ingress port is to be transmitted. At step 830, one or more paths for routing the payload to the selected egress port are determined. At step 840 an actual version of a route vector for one of the paths is generated. For example, if there are multiple paths between the given ingress port and the selected egress port, the most appropriate, such as the shortest, path may be chosen. The route vector specifies a route corresponding to at least a portion of the path. At step 850 the route vector is manipulated corresponding to a manipulation of the route vector performed along the route specified in the route vector to generate a pre-manipulated version of the route vector. At step 860 the electronic design file is generated or updated to indicate that the interconnection network comprises storage circuitry to store the actual version of the route vector and one of the pre-manipulated version of the route vector and an initial EDC calculated based on the pre-manipulated version of the route vector. At step 870 it is determined whether any more egress ports exist for the selected ingress port. If more egress ports exist, the method 800 returns to step 820, where the next egress port is selected. Steps 830 to 860 of the method 800 are then repeated for the next egress port. If at step 870 it is determined that no more egress ports exist, the method 800 continues to step 880, where it is determined whether any more ingress ports exist for the interconnection network. If more egress ports exist, the method 800 returns to step 810, where the next ingress port is selected. Steps 820 to 870 of the method 800 are then repeated for the next ingress port. If at step 880 it is determined that no more ingress ports exist, the method 800 ends.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An interconnection network for providing data access between nodes of an integrated circuit, comprising:
 a plurality of ports, each port to exchange data with a corresponding node of the integrated circuit, wherein at least one of the ports is an ingress port comprising:
  route selection circuitry responsive to a request received from a requesting node at the ingress port, to select an actual version of a route vector, which specifies a route corresponding to at least a portion of a path along which a payload should be routed to reach a selected egress port;
 wherein, in response to the request, the ingress port is configured to:
  transmit the actual version of the route vector with the payload;
  obtain an initial error detecting code calculated based on a pre-manipulated version of the route vector, wherein the pre-manipulation corresponds to a manipulation of the route vector to be performed by at least one downstream component along the route specified in the route vector; and
  transmit the initial error detecting code.

2. The interconnection network of claim 1, wherein the route specified in the route vector comprises one or more routers, the manipulation of the route vector comprises one or more sequentially applied steps, and each of the one or more routers is configured to perform one of the one or more sequentially applied steps to the route vector.

3. The interconnection network of claim 2, wherein each of the one or more routers is configured to select, based on a predetermined portion of the route vector, one of a plurality of downstream paths to route the payload down.

4. The interconnection network of claim 1, wherein the initial error detecting code comprises a type of error detecting code capable of detecting multi-bit errors.

5. The interconnection network of claim 1, wherein the route vector specifies an endpoint for the route, wherein the endpoint comprises verification circuitry configured to:
 calculate an end error detecting code based on a version of the route vector received with the payload at the endpoint;
 compare the end error detecting code with the initial error detecting code transmitted from the ingress port; and
 determine that an error has occurred when a mismatch is detected between the end error detecting code and the initial error detecting code.

6. The interconnection network of claim 5, wherein the verification circuitry is further configured to:
 compare an identifier associated with the endpoint with a transmitted endpoint identifier in the payload; and
 determine that an error has occurred when a mismatch is detected between the identifier associated with the endpoint and the transmitted endpoint identifier.

7. The interconnection network of claim 5, wherein the endpoint is the selected egress port.

8. The interconnection network of claim 5, wherein the endpoint is an intermediate component on the path between the ingress port and the selected egress port.

9. The interconnection network of claim 8, wherein the intermediate component is configured to:
 select an actual version of a second route vector, which specifies a second route corresponding to a further portion of the path;
 transmit the actual version of the second route vector with the payload;
 obtain a second initial error detecting code calculated based on a pre-manipulated version of the second route vector, wherein the pre-manipulation corresponds to a manipulation of the second route vector to be performed by at least one downstream component along the second route specified in the second route vector; and
 transmit the second initial error detecting code.

10. The interconnection network of claim 9, wherein the second route vector specifies an endpoint for the second route, wherein the endpoint for the second route comprises verification circuitry configured to:
 calculate a second end error detecting code based on a version of the second route vector received with the payload from intermediate component;
 compare the second end error detecting code with the second initial error detecting code transmitted from the intermediate component; and
 determine that an error has occurred when a mismatch is detected between the second end error detecting code and the second initial error detecting code.

11. The interconnection network of claim 1, wherein the ingress port is configured to transmit the initial error detecting code with the payload.

12. The interconnection network of claim 1, wherein the ingress port is configured to transmit the actual version of the route vector with the payload on a primary network and to transmit the initial error detecting code on a redundant network.

13. The interconnection network of claim 11, wherein the redundant network and the primary network at least partially share a common transmission channel.

14. The interconnection network of claim 1, wherein the ingress port is configured to calculate the initial error detecting code based on the pre-manipulated version of the route vector and additional information.

15. The interconnection network of claim 14, wherein the additional information relates to the payload.

16. The interconnection network of claim 1, wherein the ingress port is configured to calculate a payload error detecting code based on the payload and to transmit the payload error detecting code and the initial error detecting code.

17. The interconnection network of claim 1, wherein the manipulation comprises a shift.

18. A non-transitory storage medium storing an electronic design file representing a design of an interconnection network according claim 1.

19. A computer implemented method of generating an electronic design file representing a design of an interconnection network for providing data access between nodes of an integrated circuit;

the electronic design file defining the interconnection network comprising a plurality of ports, each port to exchange data with a corresponding node of the integrated circuit, wherein the ports include at least one ingress port and at least one egress port;

the method comprising, for a given ingress port:

selecting an egress port to which a payload received at the given ingress port is to be transmitted;

determining one or more paths for routing the payload to the selected egress port; and for each of the one or more paths:

generating an actual version of a route vector, which specifies a route corresponding to at least a portion of the path;

manipulating the route vector corresponding to a manipulation of the route vector performed along the route specified in the route vector, to generate a pre-manipulated version of the route vector; and generating or updating the electronic design file to indicate that the interconnection network comprises storage circuitry to store the actual version of the route vector and one of:

the pre-manipulated version of the route vector; and an initial error detecting code calculated based on the pre-manipulated version of the route vector.

20. A non-transitory storage medium storing a computer program for controlling a data processing apparatus to perform the method of claim 19.

* * * * *